A. RASINES & T. E. D. POWER.

BUTTON-HOOK.

No. 7,211. Reissued July 4, 1876.

WITNESSES—

Jno. D. Patten

Jos. C. Wildman

INVENTOR—

Antonio Rasines

Thomas E. D. Power per Atty. A. H. Evans & Co.

Washington D.C.

N. PETERS, PHOTO-LITHOGRAPHER, WASHINGTON, D. C.

UNITED STATES PATENT OFFICE.

ANTONIO RASINES AND THOMAS E. D. POWER, OF NEW YORK, N. Y.

IMPROVEMENT IN BUTTON-HOOKS.

Specification forming part of Letters Patent No. 167,937, dated September 21, 1875; reissue No. 7,211, dated July 4, 1876; application filed June 13, 1876.

*To all whom it may concern:*

Be it known that we, ANTONIO RASINES and THOMAS E. D. POWER, of the city and State of New York, have invented an Improvement in Button-Hooks, of which the following is a specification:

Pencil-cases have been made with a screw-tube inside the case that acts to project or retract the pencil when the case is rotated around the screw-tube, or when the screw-tube is rotated within the case.

We make use of a case of the character before named, and introduce a button-hook in a traveler that is moved by the said screw, or by a slide of any convenient kind. By this construction the button-hook is inclosed, or partially so, in an ornamental case, and the hook itself can be made sufficiently large for ordinary purposes, and the case small. Hence, it can be worn upon a watch-chain as an ornament, or carried in the pocket, and with ladies it is very convenient as a glove-buttoner.

Figure 1:
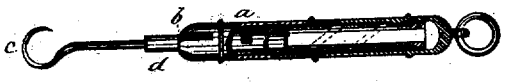
Figure 2:
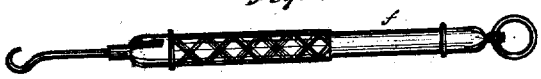
Figure 3:
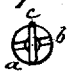

In the drawings, Figure 1 is an elevation of the hook and the case, partially in section. Fig. 2 is an elevation of the extension-case with hook projected, and Fig. 3 is an end view of the case and hook.

The portion *a* of the case is made with the transverse slot *b* at the forward end, of a width adapted to receive the button-hook *c*, and this hook *c* is upon a traveler, *d*, that is moved endwise in the case by a screw-cylinder within the case *a*. The portion *f* of the case is movable. It may either draw out of the case *a*, as illustrated in Fig. 2, or it may be made to turn upon an inner tube, *i*, as seen in Fig. 1. In either instance the follower is projected by a screw-slot, formed in the inner tube, which inner tube is revolved either by revolving the outer portion *f* of the case, or by drawing out the extension portion shown in Fig. 2.

We do not claim these screw-tubes and extension-cases, as they are well known, and in use for pencils.

Having thus described our invention, what we claim as new, and desire to secure by Letters Patent, is—

1. As a new article of manufacture, a button-hook adapted to be moved in and out of a case or cylinder, substantially as described.

2. The screw-extension case made with the transverse slot *b*, in combination with the traveler *d* and button-hook *c*, as and for the purpose set forth.

ANTONIO RASINES.
THOS. E. D. POWER.

Witnesses:
CHAS. E. CROWELL,
WILLIAM J. KELLY.